(12) United States Patent
Kaufmann et al.

(10) Patent No.: US 8,616,810 B2
(45) Date of Patent: Dec. 31, 2013

(54) INDEXABLE INSERT

(75) Inventors: Igor Kaufmann, Nürnberg (DE); Anwar Sadat Mohideen Abdul, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 267 days.

(21) Appl. No.: 13/093,783

(22) Filed: Apr. 25, 2011

(65) Prior Publication Data
US 2011/0293383 A1   Dec. 1, 2011

(30) Foreign Application Priority Data
May 27, 2010   (DE) .................... 10 2010 021 730

(51) Int. Cl.
  *B23B 27/22*   (2006.01)
(52) U.S. Cl.
  USPC .................... 407/116; 407/115; 407/114
(58) Field of Classification Search
  USPC ............................................... 407/113–116
  IPC ............................................... B23B 27/22
  See application file for complete search history.

(56) References Cited

U.S. PATENT DOCUMENTS

| | | | |
|---|---|---|---|
| 3,187,406 A | 6/1965 | Franko | |
| 3,395,434 A | 8/1968 | Wirfelt | |
| 3,947,937 A * | 4/1976 | Hertel | 407/114 |
| 3,975,809 A * | 8/1976 | Sorice et al. | 407/114 |
| 4,312,250 A * | 1/1982 | Yankoff | 82/1.11 |
| 4,606,679 A * | 8/1986 | Jeremias | 407/114 |
| 4,934,879 A | 6/1990 | van Barneveld | |
| 5,044,840 A * | 9/1991 | Fouquer et al. | 407/114 |
| 5,074,720 A * | 12/1991 | Loqvist et al. | 407/114 |
| 5,137,396 A | 8/1992 | Durschinger | |
| 5,222,843 A | 6/1993 | Katbi et al. | |
| 5,456,557 A * | 10/1995 | Bernadic et al. | 407/114 |
| 5,695,303 A * | 12/1997 | Boianjiu et al. | 407/114 |
| 5,743,681 A * | 4/1998 | Wiman et al. | 407/114 |
| 5,758,994 A | 6/1998 | Hintee et al. | |
| 5,791,833 A | 8/1998 | Niebauer | |
| 5,839,858 A * | 11/1998 | Paya et al. | 407/115 |
| 5,876,154 A * | 3/1999 | Enderle | 407/114 |
| 6,164,879 A * | 12/2000 | Krenzer | 408/224 |
| 6,241,430 B1 * | 6/2001 | Norstrom | 407/114 |
| 6,843,620 B2 * | 1/2005 | Inayama | 407/114 |
| 7,182,555 B2 | 2/2007 | Kitagawa et al. | |
| 7,234,901 B2 * | 6/2007 | Ishida | 407/114 |
| 7,278,805 B2 | 10/2007 | Ley | |
| 7,367,755 B2 | 5/2008 | Wurfels et al. | |
| 7,374,372 B2 | 5/2008 | Rofner et al. | |
| 7,488,143 B2 | 2/2009 | Muren et al. | |
| 7,494,302 B2 | 2/2009 | Ishida | |

(Continued)

FOREIGN PATENT DOCUMENTS

| | | |
|---|---|---|
| DE | 44 37 093 A1 | 4/1996 |
| DE | 10 2006 017 074 A1 | 10/2007 |
| EP | 1 181 123 B1 | 4/2000 |

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

An indexable insert having two main faces (1) that face away from one another and that each have a full-perimeter cutting edge (3) at the face periphery, and having a chip step (6) adjoining the cutting edge (3), having a continuously curved surface.

8 Claims, 6 Drawing Sheets

(56) References Cited

U.S. PATENT DOCUMENTS

| | | |
|---|---|---|
| 7,621,700 B2 | 11/2009 | Jonsson et al. |
| 7,837,417 B2 * | 11/2010 | Blomstedt .................... 407/113 |
| 2003/0059265 A1 | 3/2003 | Brockett et al. |
| 2005/0214081 A1 | 9/2005 | Satran et al. |

FOREIGN PATENT DOCUMENTS

| | | |
|---|---|---|
| EP | 1 052 069 B1 | 4/2003 |
| EP | 1 017 526 B1 | 5/2003 |
| WO | 96/20802 A1 | 7/1996 |
| WO | 2008/038262 A1 | 4/2008 |

\* cited by examiner

Stand der Technik

Stand der Technik

INDEXABLE INSERT

CLAIM TO PRIORITY

This application is a National entry application of German Application No. 10 2010 021 730.1, filed on 27 May 2010, the entire contents of which are incorporated herein by reference.

BACKGROUND OF THE INVENTION

The present invention relates to a double-sided indexable insert. These indexable inserts have two main faces that face away from one another. Each of the main faces is bordered, at its face periphery, by a full-perimeter cutting edge. A chip step adjoins the cutting edge. Such an indexable insert is known, for example, from U.S. Pat. No. 7,278,805 B2. Such chip steps normally consist of an inlet region and an outlet region. The inlet region in this case has a flat face that is inclined relative to the cutting edge. At the lowest point of the chip step the inlet region graduates into the outlet region. The outlet region in this case is usually rounded. Frequently, in the region of the transition from the inlet region to the outlet region, unwanted stress concentrations occur at the chip step. These stress concentrations result in destruction of the indexable insert.

SUMMARY OF THE INVENTION

The invention is therefore based on the object of designing the indexable insert such that the alternating stresses are reduced.

The fundamental concept of the invention consists in designing the surface of the chip step in a continuously curved manner. The radius of curvature of the surface of the chip step is initially very large and becomes appreciably smaller, and thus in turn constitutes an inlet region of the chip step. From the lowest point of the chip step, this then small radius of curvature graduates into a region having a larger radius of curvature and thus constitutes the outlet region of the chip step. Owing to the fact that the surface of the chip step always has a curvature, a uniform chip forming occurs. The chip, which cools down as the distance from the cutter increases, is still easily shaped when in the very warm state. The shaping of the chip likewise increases progressively as the radius becomes progressively smaller. In this way, the chip immediately acquires a tendency to deform continuously within the chip step. Because of the continuous deformation of the chip, the friction of the chip on the tool face is also minimized.

Advantageously, a chip step is provided with an inlet region having a plurality of radii of curvature of the surface that become incrementally smaller, and with an outlet region having radii of curvature of the surface that become incrementally larger. The wedge angle therefore changes by the same amount.

The reduction in size of the radius of curvature of the chip-step surface in the inlet region and the increase in size of the radius of curvature of the chip-step surface in the outlet region can be realized either incrementally or continuously. It is of importance only that the radii of curvature graduate tangentially into one another, in order to prevent a fluted surface in the region of the chip step. In this respect, the present invention also differs fundamentally from the known fluted design of the chip cavity known from EP 1 181 123 B1 and shown therein.

In a further design of the invention, a plurality of chip forming elements are also disposed next to one another in the region of the chip step. In their design, the chip forming elements again follow the fundamental concept pursued by the invention, whereby an outlet region, having radii of the surface curvature that change continuously in a progressive manner, adjoins the inlet region of the chip cavity. The run-on faces of the chip forming elements that face toward the cutting edge therefore each have a curved surface having a progressively changing radius of curvature. These radii of curvature also graduate tangentially into one another.

In a further design, at their end of the run-on face that faces away from the cutting edge, the chip forming elements have a protruding transverse rib. This transverse rib acts together with a spacing groove, which is formed into the insert body and adjoins the transverse rib. That is to say, the spacing groove is disposed between the respective chip forming element and a central bearing contact region projecting out of the main face. When a tool has been chucked, the central bearing contact region enables a main face of the indexable insert to bear in a level manner on a corresponding counter-face in the tool seat. In order to prevent this central bearing contact region from being damaged by chips or chip fragments, the transverse ribs on the chip forming elements and the spacing grooves ensure that the chip diverted from the chip forming elements cannot come into contact with the central bearing contact region.

In a further design of the invention, the central bearing contact region is divided into a multiplicity of bearing contact frustums by formed-in intermediate channels. These bearing contact frustums project, in the manner of islands, out of the channel system constituted by the intermediate channels. The intermediate channels enable a flooded cooling system to be used. The cooling lubricant used thus passes easily into the region of the chip step, and can therefore easily be forwarded to the cutting edge.

Since the tool cross-section of the indexable insert is weakened overall as a result of the division of the central bearing contact region, it is proposed, in a further preferred embodiment, to shape the bore periphery of the central through bore, which can receive, for example, a clamping pin, such that it rises toward the bore interior, in order thus to increase further the material cross-section at the tool.

DETAILED DESCRIPTION OF THE INVENTION

Figure 1:
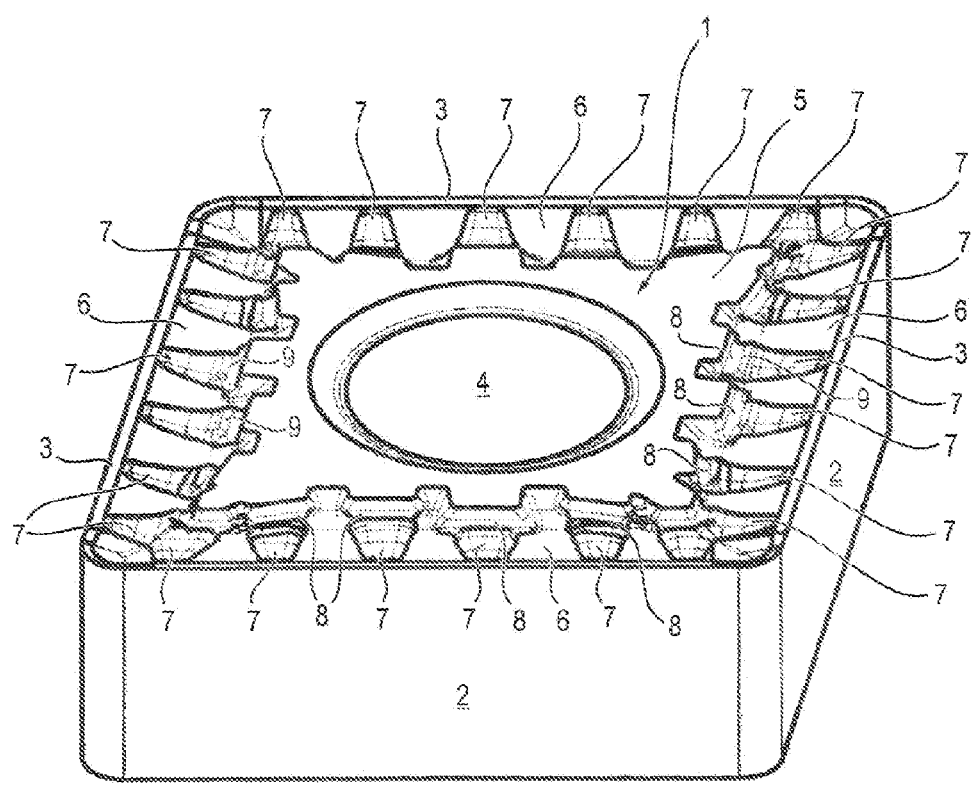
FIG. 1 shows a perspective view of an indexable insert according to the invention.

In FIG. 1, the main face 1 and the two vertical side faces 2 of the indexable insert according to the invention face towards the viewer. The main face 1 is bordered by the full-perimeter cutting edge 3. The main face 1 is opened, in its center, by a central through-bore 4. The through-bore 4 serves to receive a clamping bolt or similar when the indexable insert is clamped in the carrier tool. The through-bore 4 is bordered by the central bearing contact region 5 projecting out of the main face 1. Via the central bearing contact region 5, the indexable insert, when in the clamped state, bears on a corresponding counter-surface in the tool seat.

The chip step 6 adjoins the cutting edge 3 in the direction of the central bearing contact region 5. A plurality of chip forming elements 7, each at a distance from one another, are disposed in the chip step 6. Spacing grooves 8 are in each case formed-in between the chip forming elements 7 and the central bearing contact region 5. The chip forming elements 7 each have a transverse rib 9.

Figure 2:
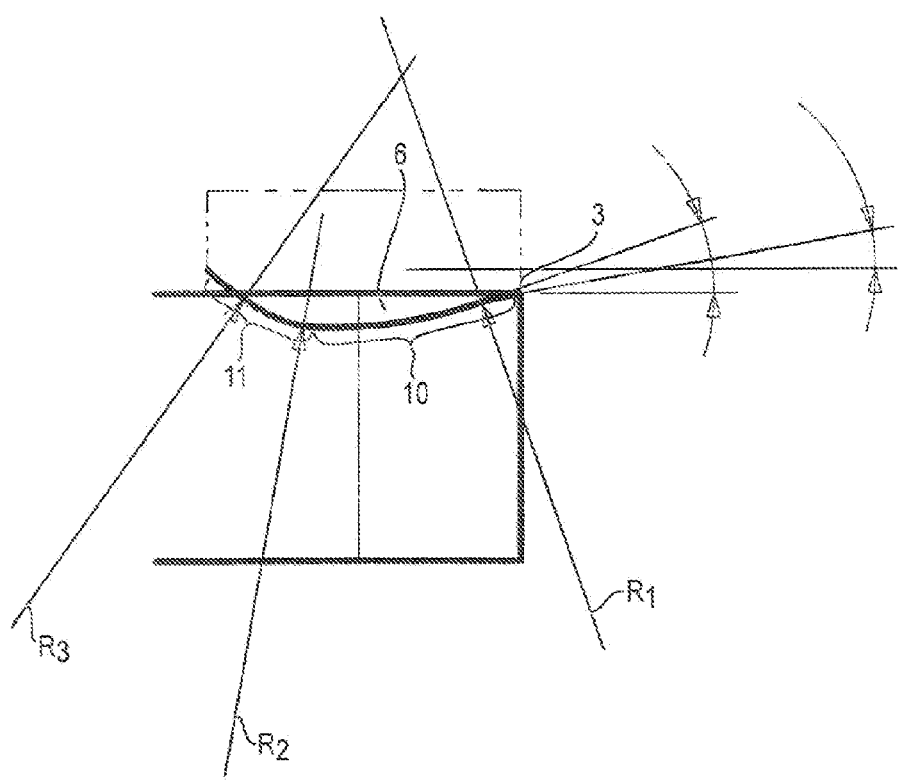
FIG. 2 shows a cross-sectional representation of the surface shape of the chip step.

The shape of the surface of the chip step 6 is represented in FIG. 2. In FIG. 2, the chip step 6 directly adjoins the cutting edge 3. It is also conceivable, however, for the cutting edge 3 to be adjoined first by a protective bevel or an edge rounding, which, in turn, are then in each case adjoined by the chip step 6, for its part. As viewed from the cutting edge 3, thus as viewed from the right in FIG. 2, the surface of the chip step 6 firstly has the inlet region 10. At the lowest point of the chip step 6, the inlet region 10 graduates into the outlet region 11. Provided in the inlet region are a plurality of large radii R1, which become smaller as the distance from the cutting edge increases. Disposed in the outlet region 11, firstly, is the radius R2, which is very much smaller in comparison with the large radius R1 and which, in the further course of the outlet region 11, graduates tangentially into the again larger radius R3. The chip step 6 thus has, in the inlet region 10, radii of curvature R of the surface that become smaller and, in the outlet region 11, radii of curvature R of the surface that become larger again.

Figure 3:
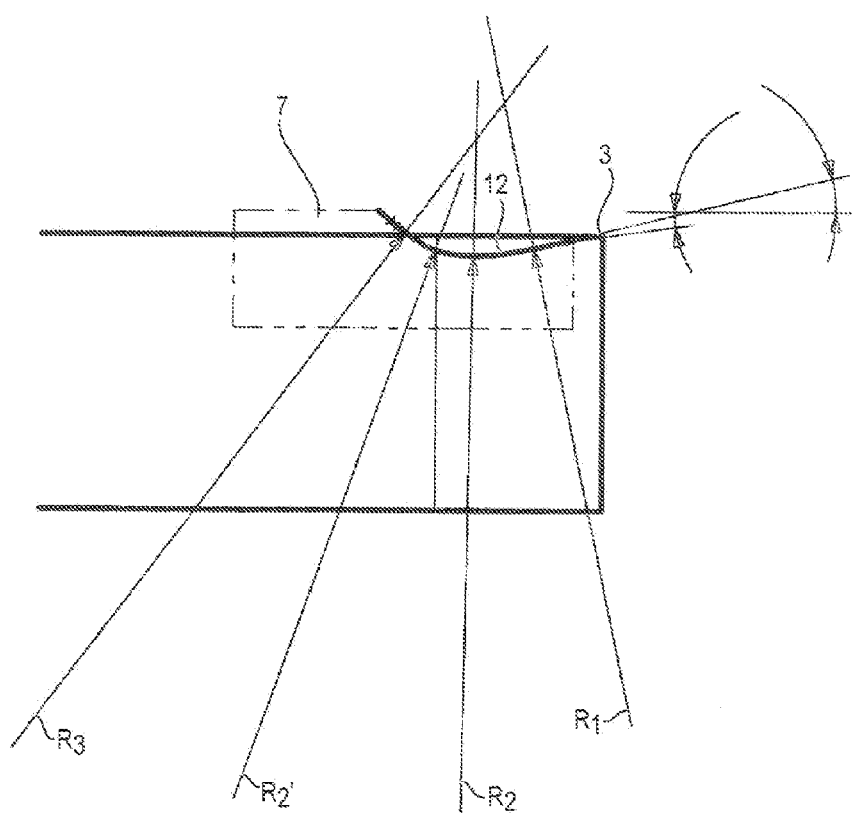
FIG. 3 shows a cross-sectional representation of the surface shape of a chip forming element.

FIG. 3 shows the corresponding shape of the curvature of the run-on face 12 at the chip forming element 7. Again, as viewed from the cutting edge 3, thus as viewed from the right in FIG. 3, the run-on face 12 starts with a large radius R1. Adjoining this large radius R1 is the smaller radius R2. Adjoining the yet smaller radius R2' is the again larger radius R3. The radii R1, R2 and R3, and the angles resulting therefrom, have values that are usual in chip-removing technology.

Figure 4:
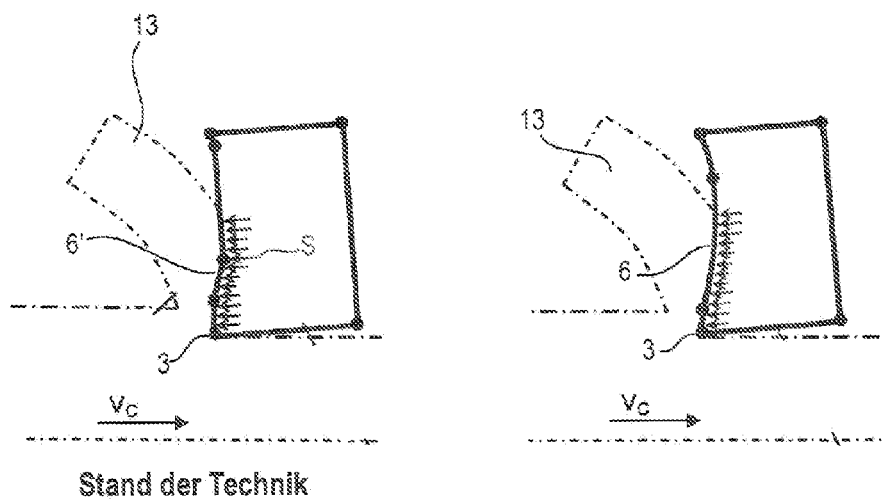
FIG. 4 shows a comparative representation of the stress distribution in an indexable insert according to the prior art and in the indexable insert designed according to the invention.

Indicated by broken lines in FIG. 4 is the chip 13, which is cut off from the workpiece 14, likewise indicated by a broken line. Represented in the left part of FIG. 4 is the stress characteristic at the cross-section of a chip step 6' according to the prior art. The arrows represent the stress characteristic over the chip-step face. Clearly visible is the stress concentration S at the lowest point of the chip step 6' according to the prior art, which has a stepped chip-step surface. In the right part of FIG. 4, by contrast, the arrows indicate the constant stress characteristic of the chip step 6 according to the invention. Here, owing to the fact that the radii graduate tangentially into one another, no stress concentrations S occur. The measurements were taken at a cutting speed of 200 m per minute, a cut depth of 3 mm and a feed of 0.5 mm per revolution.

Figure 5:
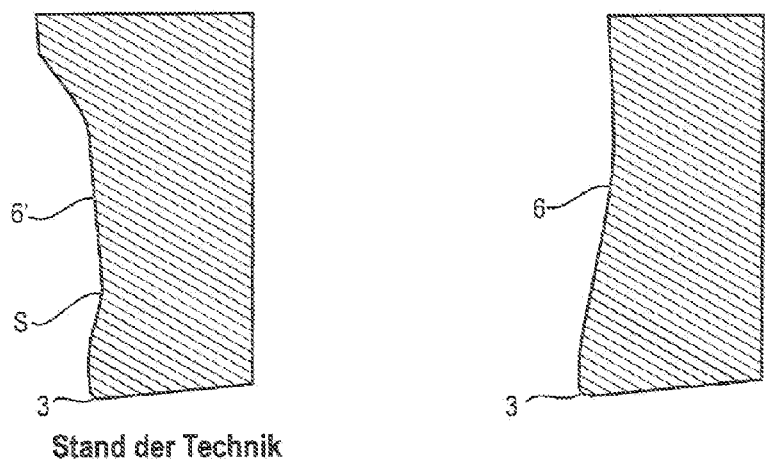
FIG. 5 shows, comparatively, the stepped shape of a chip step according to the prior art and the continuous shape of the chip step designed according to the invention.

Correspondingly, the left part of FIG. 5 shows the cross-sectional representation of the step-shaped surface of the chip step 6' according to the prior art and, correspondingly, the right part of FIG. 5 shows the cross-sectional representation of the continuously curved surface of the chip step 6 according to the invention. Clearly visible in the left part of FIG. 5 is the surface alteration resulting from the alternating stresses in the region of the stress concentration S.

Figure 7:
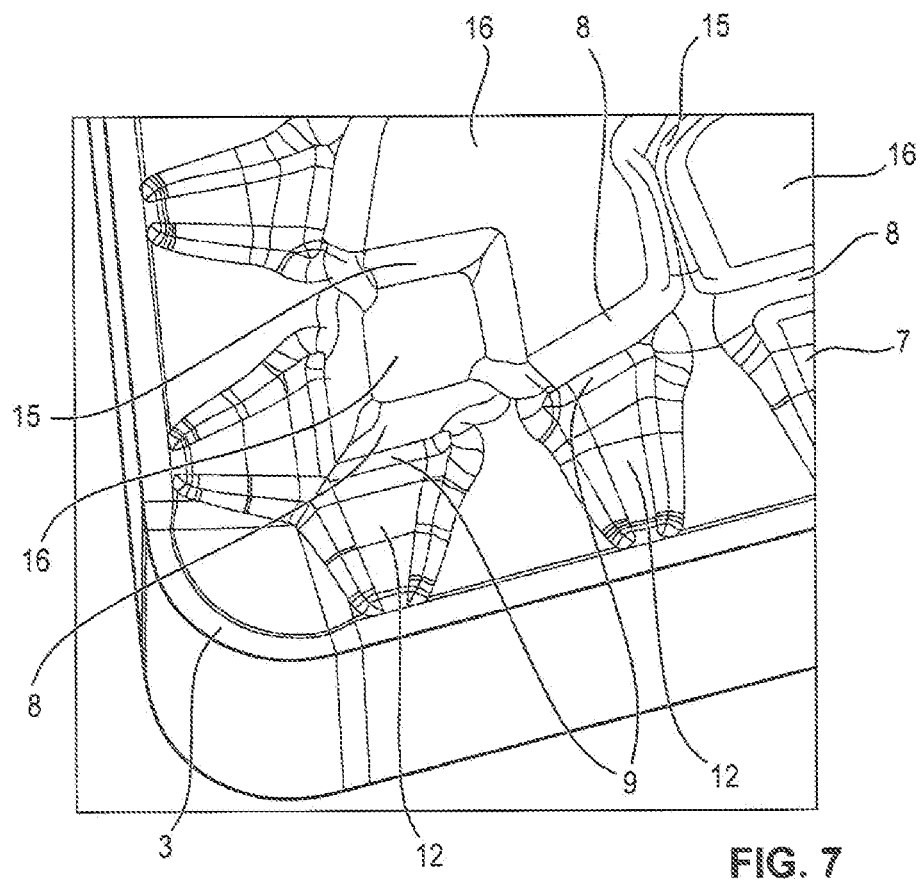
FIG. 7 shows an enlarged representation of the portion VII from FIG. 6.

The run-on faces 12, and the transverse ribs 9 of the chip forming element 7 that delimit the run-on faces 12 on the side thereof that faces away from the cutting edge 3, can be seen yet again in the representation of FIG. 7. Additionally shown are the spacing grooves 8 formed-in between the chip forming elements 7 and the central bearing contact region 5.

Figure 6:
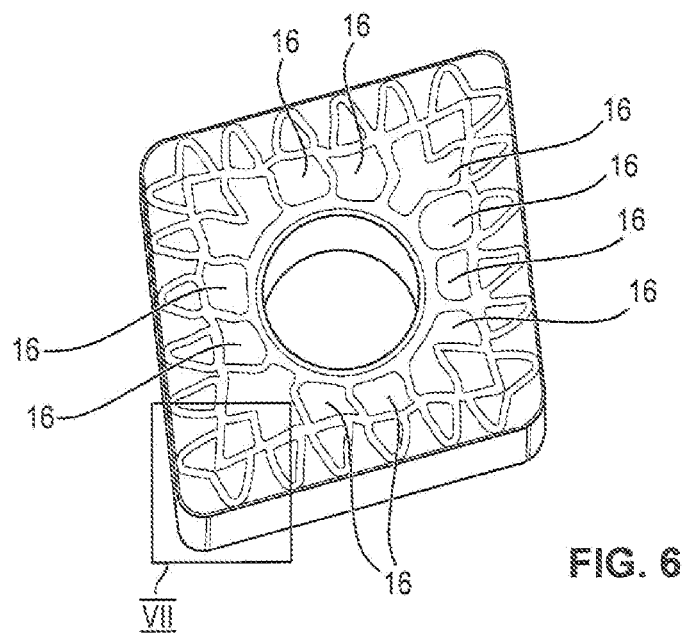
FIG. 6 shows a top view of an indexable insert according to the invention having a central bearing contact region divided into a multiplicity of bearing contact frustums.
Figure 8:
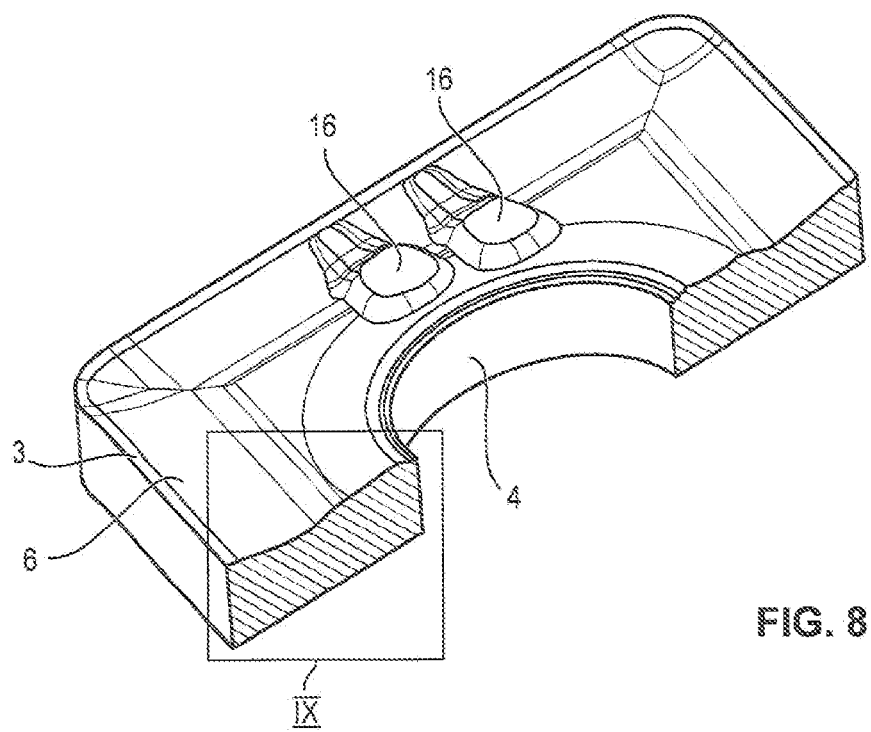
FIG. 8 shows a section through an indexable insert having a bearing contact region divided into a multiplicity of bearing contact frustums.
Figure 9:
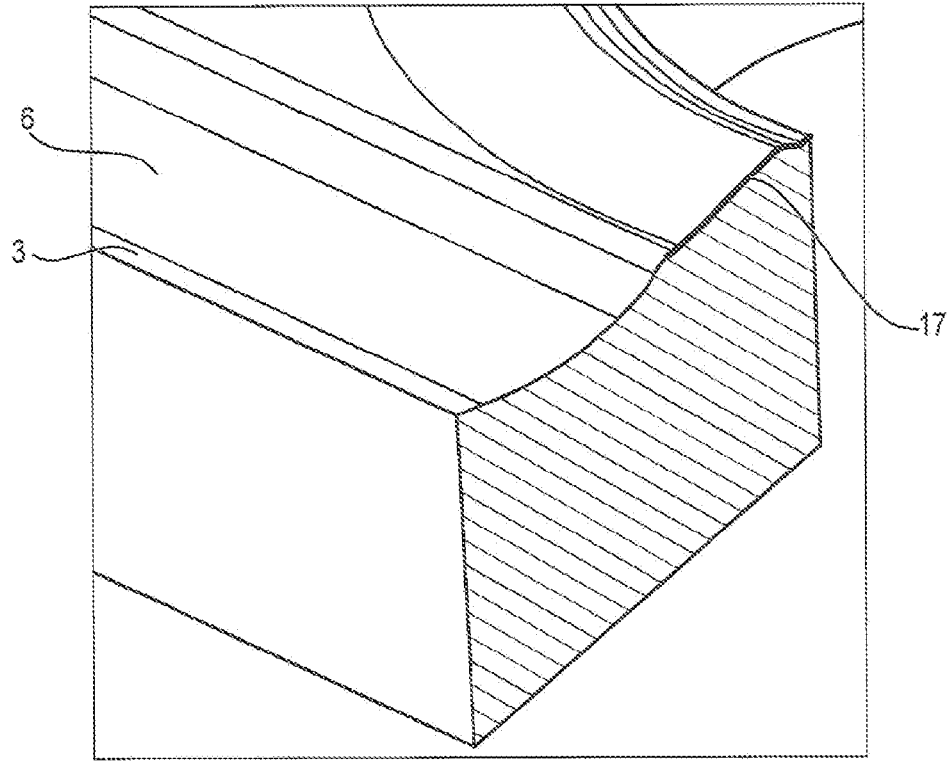
FIG. 9 shows the portion IX from FIG. 8.

The representation of FIG. 6 also shows the embodiment of the central bearing contact region 5, which is divided by intermediate channels 15 into a multiplicity of bearing contact frustums 16. FIG. 8 and FIG. 9, finally, show the bore periphery 17 rising toward the through bore 4. Because of the rise of the bore periphery 17 toward the through bore 4, the quantity of material is maximized in the region of the bore periphery 17, so helping to stabilize the indexable insert.

What is claimed is:

1. An indexable insert having two main faces that face away from one another, wherein each face has a full-perimeter cutting edge, a chip step adjoining the cutting edge and having a continuously curved surface, a chip forming element disposed in the chip step, the chip forming element having a run-on face, a transverse rib protruding therefrom, and a spacing groove disposed between the chip forming element and a central bearing contact region.

2. The insert as claimed in claim 1, wherein the chip step further comprises an inlet region having a plurality of radii of curvature (R1) that become smaller as the distance from the cutting edge increases, and further comprising an outlet region that adjoins the inlet region and has a plurality of radii of curvature (R2, R3) that become incrementally larger.

3. The insert as claimed in claim 2, wherein the plurality of radii of curvature (R2, R3) of the outlet region of the chip step graduate tangentially into one another.

4. The insert as claimed in claim 1, wherein the chip step further comprises an inlet region having a radius of curvature (R) that becomes continuously smaller and an outlet region having a radius of curvature (R) that becomes continuously larger.

5. The insert as claimed in claim 4, wherein the inlet region graduates into outlet region at the lowest point of the inlet region.

6. The insert as claimed in claim 1, wherein the run-on face of the chip forming element has a curved surface with a radius of curvature (R) that decreases progressively as the distance from the cutting edge increases.

7. The insert as claimed in claim 1, wherein the central bearing contact region divided by intermediate channels into a multiplicity of bearing contact frustums.

8. The insert as claimed in claim 1, wherein the central through bore has a bore periphery rising toward the bore.

* * * * *